(12) United States Patent
Huber et al.

(10) Patent No.: US 12,368,323 B1
(45) Date of Patent: Jul. 22, 2025

(54) WIRELESS POWER TRANSFER TRANSMITTER SYSTEM IN ASPHALT PAVEMENT AND CONSTRUCTION/REHABILITATION METHOD THEREOF

(71) Applicants: Heritage Environmental Technologies, LLC, Indianapolis, IN (US); Heritage Research Group, LLC, Indianapolis, IN (US); Magment GmbH, Munich (DE)

(72) Inventors: Gerald Anton Huber, Indianapolis, IN (US); Xishun Zhang, Indianapolis, IN (US); Lynn Jay Shireman, Indianapolis, IN (US); Mauricio Esguerra, Munich (DE); Rafael M. Acevedo Daunas, Bethesda, MD (US)

(73) Assignees: Heritage Environmental Technologies, LLC, Indianapolis, IN (US); Heritage Research Group, LLC, Indianapolis, IN (US); Magment GmbH, Munich (DE)

( * ) Notice: Subject to any disclaimer, the term of this patent is extended or adjusted under 35 U.S.C. 154(b) by 10 days.

(21) Appl. No.: 18/420,850

(22) Filed: Jan. 24, 2024

(51) Int. Cl.
*E01C 7/18* (2006.01)
*B60L 53/12* (2019.01)
(Continued)

(52) U.S. Cl.
CPC ............ *H02J 50/005* (2020.01); *B60L 53/12* (2019.02); *B60L 53/302* (2019.02); *B60L 53/31* (2019.02);
(Continued)

(58) Field of Classification Search
CPC ......... H02J 50/005; H02J 50/10; B60L 53/12; B60L 53/302; B60L 53/31; E01C 7/187; E01C 9/00
See application file for complete search history.

(56) References Cited

U.S. PATENT DOCUMENTS

| 2023/0068912 | A1* | 3/2023 | Diamond | H02J 50/10 |
| 2024/0067019 | A1* | 2/2024 | Wang | B60L 53/12 |

FOREIGN PATENT DOCUMENTS

| CN | 116834587 A | 10/2023 |
| EP | 3438366 A1 | 2/2019 |

(Continued)

OTHER PUBLICATIONS

International Search Report dated Nov. 5, 2024 of International Application No. PCT/IB2024/057383.

*Primary Examiner* — Daniel Cavallari
(74) *Attorney, Agent, or Firm* — Qinghong Xu

(57) ABSTRACT

A wireless power transfer transmitter system and a method of constructing an asphalt pavement containing the wireless power transfer transmitter system are provided. The present disclosure allows future rehabilitation of the asphalt pavement. The construction method includes: forming a channel in a layer of a drivable civil structure; forming a magnetizable asphalt mixture in the channel, the magnetizable asphalt mixture including an asphalt binding substance and magnetizable particles; and placing a pre-manufactured transmitter coil or a pre-manufactured transmitter coil assembly in the magnetizable asphalt mixture. The pre-manufactured transmitter coil assembly includes a transmitter coil and a holder, which may or may not be permanently installed in the pavement, a part of the transmitter coil is installed in the holder, and 0 to 90 percent of the transmitter coil is embedded in the magnetizable asphalt mixture.

20 Claims, 13 Drawing Sheets

(51) Int. Cl.
  *B60L 53/302* (2019.01)
  *B60L 53/31* (2019.01)
  *E01C 9/00* (2006.01)
  *H02J 50/00* (2016.01)
  *H02J 50/10* (2016.01)
(52) U.S. Cl.
  CPC ................ *E01C 7/187* (2013.01); *E01C 9/00* (2013.01); *H02J 50/10* (2016.02)

(56) References Cited

FOREIGN PATENT DOCUMENTS

| WO | 2013007825 A2 | 1/2013 |
| WO | 2017060387 A1 | 4/2017 |
| WO | 2021093995 A1 | 5/2021 |

\* cited by examiner

WIRELESS POWER TRANSFER TRANSMITTER SYSTEM IN ASPHALT PAVEMENT AND CONSTRUCTION/REHABILITATION METHOD THEREOF

TECHNICAL FIELD

Embodiments of the present disclosure generally relate to wireless charging technologies, and more particularly, to a wireless power transfer transmitter system and a construction method of the wireless power transfer transmitter system in an asphalt pavement. The wireless power transfer transmitter system and construction method may be used for static charging or dynamic charging.

BACKGROUND

One version of an electric road includes a transmitter coil installed in an asphalt road which creates a magnetic field for charging of vehicles equipped with a receiver that pass overhead on the road. Another version is for charging of vehicles equipped with a receiver that park on the road or parking lot. Power is transferred wirelessly using the magnetic field created by the transmitter coil.

SUMMARY

Embodiments of the present disclosure provide a wireless power transfer transmitter system and a construction method of an asphalt pavement that contains the wireless power transfer transmitter system.

According to an aspect, there is provided a construction method of an asphalt pavement that includes a wireless power transfer transmitter system. The method includes: forming a channel in a layer of a drivable civil structure; forming a magnetizable asphalt mixture in the channel, wherein the magnetizable asphalt mixture includes an asphalt binding substance and particles, some or all of which are magnetizable; wherein a percentage of the particles in the magnetizable asphalt mixture is one hundred percent or less; and placing a pre-manufactured transmitter coil or a pre-manufactured transmitter coil assembly in the magnetizable asphalt mixture, wherein the pre-manufactured transmitter coil assembly includes a transmitter coil and a holder, a part of the transmitter coil is installed in the holder, and 0 to 90 percent of the transmitter coil is embedded in the magnetizable asphalt mixture.

According to another aspect, there is provided a wireless power transfer transmitter system, including:
 a channel formed in a layer of a drivable civil structure;
 a magnetizable asphalt mixture formed in the channel, wherein the magnetizable asphalt mixture includes an asphalt binding substance and particles, some or all of which are magnetizable; wherein a percentage of the particles in the magnetizable asphalt mixture is one hundred percent or less; and
 a pre-manufactured transmitter coil or a pre-manufactured transmitter coil assembly formed in the magnetizable asphalt mixture, wherein the pre-manufactured transmitter coil assembly includes a transmitter coil and a holder, a part of the transmitter coil is installed in the holder, and 0 to 90 percent of the transmitter coil is embedded in the magnetizable asphalt mixture.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

DETAILED DESCRIPTION

Figure 1:
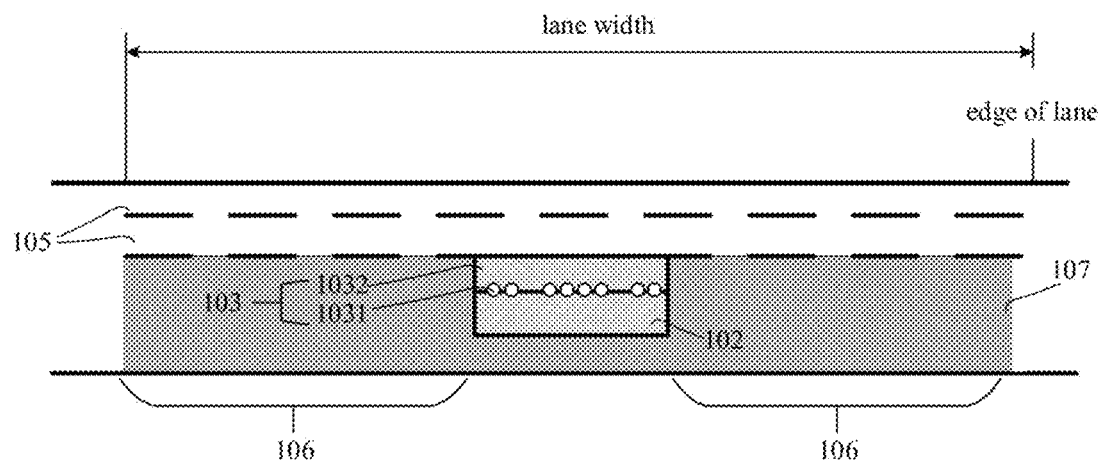
FIG. 1 shows the location of a wireless power transfer transmitter system in a finished drivable civil structure according to an embodiment of the present disclosure.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to implement such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Before introducing the technologies provided by embodiments of the present disclosure, some terminologies used herein are first described.

Asphalt binder—a black cementitious material, typically from the residue of crude oil refining that is used to glue aggregate particles together. In Europe this material is referred to as "bitumen".

Asphalt mixture or asphalt mix—in the normal sense, this is a mixture of broken pieces of rock (aggregate particles) of different sizes that are combined to produce a mixture of aggregate particles coated with asphalt binder. During the construction process the aggregate particles are coated with asphalt binder and the mixture is compacted on the road to produce an asphalt layer as part of a pavement structure.

Static charging is the process of transferring electrical power to a battery while a vehicle is stationary.

Dynamic charging is the process of transferring electrical power to a battery or to an electric motor while a vehicle is moving.

The following describes embodiments of the present disclosure.

In order to realize a transmitter coil installed on a road to achieve wireless charging, a magnetizable asphalt mixture may be formed in the road. The magnetizable asphalt mixture is an asphalt mixture that uses magnetizable particles (e.g., ferrite particles) of different sizes to replace all or a portion of the natural aggregate particles typically used in asphalt mixtures on roadways. The magnetizable asphalt mixture may be formed on-site or in-place in the road to become an integral part of the road. A pre-manufactured transmitter coil or a pre-manufactured transmitter coil assembly may be formed in the magnetizable asphalt mixture. In this way, when an electrical current flows in the transmitter coil or a transmitter coil of the pre-manufactured transmitter coil assembly, a magnetic field can be generated, and the magnetic field serves a medium for power transfer, by means of which a current is induced in a secondary coil (also called as a receiver coil) which may be arranged on underside of a vehicle. Accordingly, the vehicle can be charged.

Figures 2A, 2B, 2C:
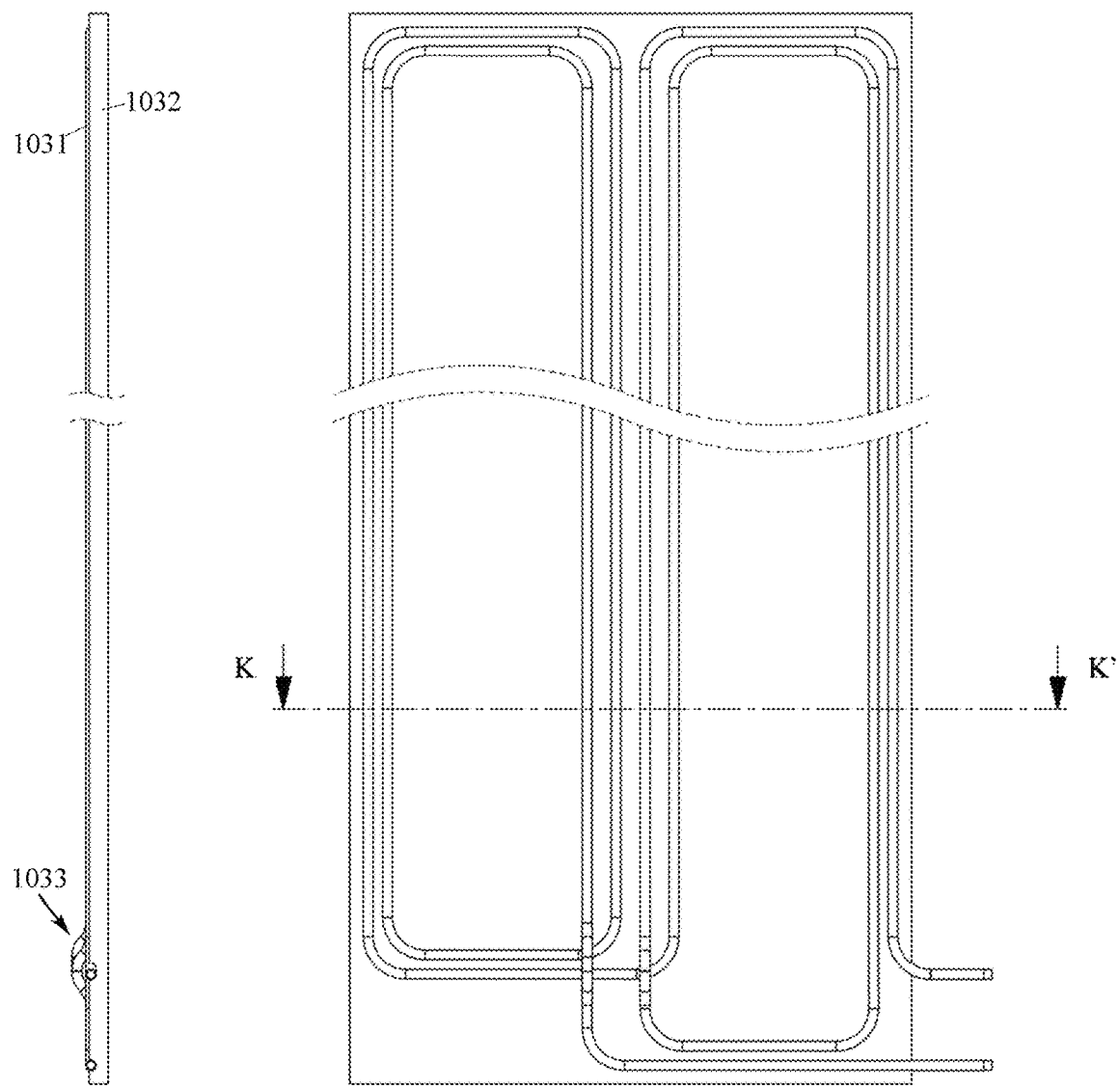
FIG. 2A shows a lateral cross section of a holder and embedment of a transmitter coil in the holder according to an embodiment of the present disclosure.
FIG. 2B shows a longitudinal cross section view of the transmitter coil and the holder.
FIG. 2C shows a plan view of the transmitter coil and holder viewed from the underside of the holder.
Figure 3:
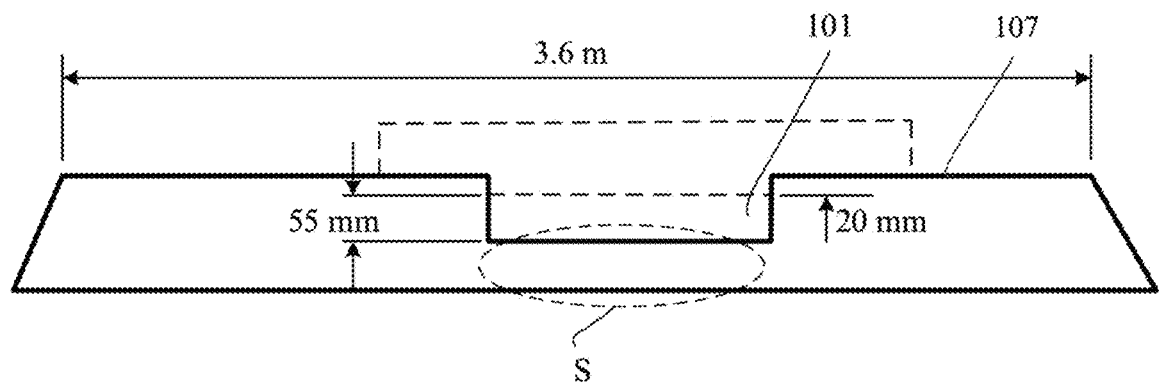
FIG. 3 is a schematic diagram showing a channel for placing the magnetizable asphalt mixture.

FIG. 1 shows the location of a wireless power transfer transmitter system in a finished drivable civil structure according to an embodiment of the present disclosure. FIG. 2A to FIG. 2C show the structure of a pre-manufactured transmitter coil assembly according to an embodiment of the present disclosure. FIG. 3 is a schematic diagram showing a channel for placing the magnetizable asphalt mixture.

Referring to FIG. 1 and FIG. 3, the wireless power transfer transmitter system may include a channel 101, a magnetizable asphalt mixture 102, and a pre-manufactured transmitter coil assembly 103.

The channel 101 is formed in a layer of a drivable civil structure, for example, the second or third layer from the surface of drivable civil structure. The drivable civil structure may be a road or floor inside or outside a building, or other types of roads. For example, if the vehicle is a forklift or other vehicle that operates primarily indoors, such as a warehouse, the wireless power transfer transmitter system may be embedded in the floor or attached to the surface of the floor of the building.

The magnetizable asphalt mixture 102 is formed in the channel 101. The magnetizable asphalt mixture 102 includes an asphalt binding substance and particles, some or all of which are magnetizable. The magnetizable particles in the magnetizable asphalt mixture 102 may be ferrite particles. The percentage of the magnetizable particles in the magnetizable asphalt mixture 102 may be one hundred or less. For example, the magnetizable asphalt mixture 102 may have a high-volume fraction of ferrite particles to provide power transfer to vehicles while parked or during motion. For example, the volume fraction of the ferrite particles in the total mixture volume of the magnetizable asphalt mixture 102 may be not smaller than 35% and up to 90%. For example, the volume fraction may be 70% to 85%. Larger volume fraction results in a higher initial permeability. The higher the selected initial permeability, the more stray fields can be avoided and the lower the magnetic losses. The lower magnetic losses can make the slab slimmer and less expensive. In other words, the magnetizable asphalt mixture 102 can be considered as a magnetizable core containing ferrite particles bound together with an asphalt binder.

Ferrite is a manufactured ceramic material. The raw product contains various sizes and shapes. For example, the largest pieces may be up to 20 cm. In general, ferrite pieces may have an average size of 3 to 5 cm. The ferrite pieces are reduced to smaller sizes using a crushing operation similar to the crushing of stone. The crushed ferrite pieces are separated into individual sizes so proportions of each size may be recombined together to obtain a desired gradation. The produced magnetizable asphalt mixture includes the ferrite particles and an asphalt binding substance. For example, the asphalt binding substance may be at least one of asphalt binder, epoxy, silicon or alternative binders composed of natural or synthetic non-crystalline materials.

The pre-manufactured transmitter coil assembly 103 is formed in the magnetizable asphalt mixture 102. As shown in FIG. 2A and FIG. 2B, the pre-manufactured transmitter coil assembly 103 includes a transmitter coil 1031 and may also include a holder 1032. A part of the transmitter coil 1031 is installed in the holder 1032, and another part of the transmitter coil 1031 is embedded in the magnetizable asphalt mixture 102. That is, the transmitter coil 1031 is mounted in the holder 1032 with a desired exposure, typically between 0 to 90 percent of the diameter of the transmitter coil 1031.

The top of the pre-manufactured transmitter coil assembly may be located about 10 to 12 cm below the surface of the finished pavement. An asphalt pavement may have for example two layers placed on top of the base mixture. With the transmitter coil assembly placed within the base layer, there will be two layers of conventional asphalt mixture above the transmitter coil assembly. Herein, the two layers of conventional asphalt mixture are collectively referred to as a surface layer 105. The surface layer 105 covers the pre-manufactured transmitter coil assembly 103 as well as an asphalt mixture 106 of the drivable civil structure that surrounds the magnetizable asphalt mixture 102. The surface layer may be more or less than 10 cm thick but should be sufficiently thick to allow future rehabilitation of the pavement by removing a portion of the surface by milling or other typical rehabilitation methods and replacing with a new layer. The future rehabilitation allows for removal of deteriorated materials at the surface of the pavement and replacement with similar new materials. The transmitter coil installed in the pavement is expected to have a longer life than the surface of an asphalt pavement which is generally between 10 and 15 years.

In another embodiment, the holder 1032 may be used during installation of the transmitter coil 1031 and after the transmitter coil 1031 is bonded at an appropriate depth or a desired depth into the magnetizable asphalt mixture, the holder 1032 is removed. Or, in yet another embodiment, the transmitter coil may be installed into the magnetizable asphalt without a holder.

In the two cases, the wireless power transfer transmitter system may include a channel, a magnetizable asphalt mixture and a pre-manufactured transmitter coil. That is, the wireless power transfer transmitter system may not include a holder.

Figure 4:
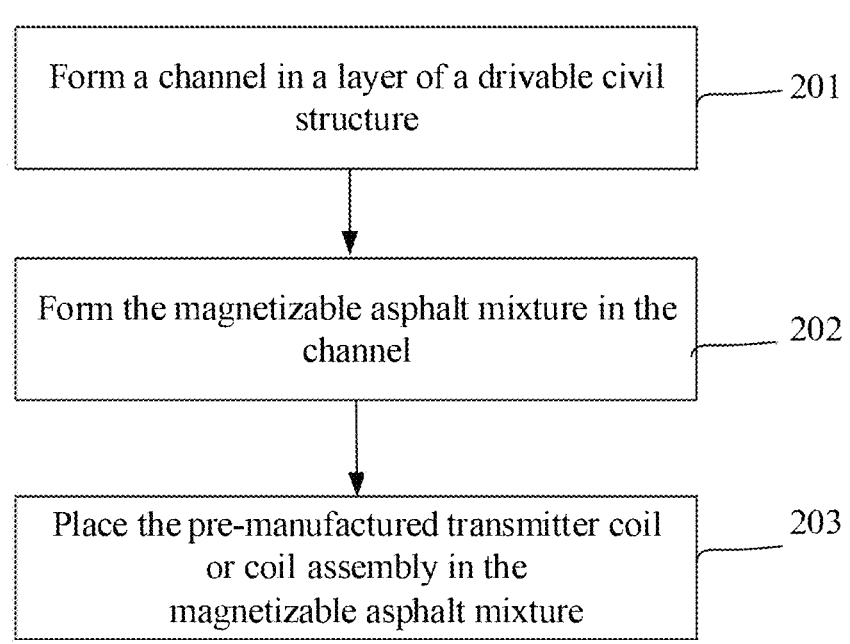
FIG. 4 is a flowchart of a construction method of the wireless power transfer transmitter system according to an embodiment of the present disclosure.

FIG. 4 is a flowchart of a construction method of the wireless power transfer transmitter system according to an embodiment of the present disclosure. The method may include the following steps:

In step 201, the channel 101 is formed in a layer of a drivable civil structure. The channel may be a long continuous structure into which one or more pre-manufactured transmitter assemblies, or one or more pre-manufactured transmitter coils may be installed. Such a long channel would be most applicable to a dynamic charging situation. Alternatively, the channel may be short and accommodate installation of one or more pre-manufactured transmitter assemblies or one or more pre-manufactured transmitter coils. Such a short channel would be most applicable to a static charging situation in a parking area.

In step 202, the magnetizable asphalt mixture 102 is formed in the channel 101.

In step 203, the pre-manufactured transmitter coil assembly (assemblies) 103 or pre-manufactured transmitter coil(s) is(are) placed in the magnetizable asphalt mixture 102.

The above method applies to in-place or on-site construction of the wireless power transfer transmitter system. With this method, the wireless power transfer transmitter system is shaped on-site in the drivable civil structure and formed as an integral part of the finished drivable civil structure.

In the above method, the pre-manufactured transmitter coil assembly 103 includes the transmitter coil 1031 and may also include the holder 1032. The pre-manufactured transmitter coil assembly 103 is placed on the magnetizable asphalt mixture 102, with the transmitter coil 1031 facing downward in contact with the freshly placed magnetizable asphalt mixture 102 and the holder 1032 facing upwards towards the surface layer 105 which is to be formed covering the pre-manufactured transmitter coil assembly 103. The holder 1032 can protect the transmitter coil 1031 from potential damages during subsequent processes such as compaction. Also, the holder 1032 can realize bonding with the surface layer 105 so as to avoid separation or peeling between layers of the drivable civil structure.

The following provides details about how to perform individual steps in the in-place construction method.

Referring to FIG. 1, two layers of conventional asphalt mixture, for example, a 4 cm surface layer and a 6 cm intermediate layer, are placed above the transmitter coil assembly. As mentioned above, the two layers of conventional asphalt mixture may be collectively called as a surface layer 105. The combined thickness of the layers above the transmitter coil assembly may be more or less than 10 cm. These two upper layers (collectively marked as 105) of asphalt mixture and a base layer 107 of asphalt mixture (there may be other layers of base mixture below the one shown) are constructed using normal construction processes.

The vertical location of the wireless power transfer transmitter system within the drivable civil structure (e.g., pavement structure) is selected to allow for rehabilitation of the asphalt pavement in the future by removing a portion of the material above the wireless power transfer transmitter system and replacing it with new asphalt mixture the same thickness as the removed layer.

According to some embodiments, forming the channel may include forming the channel by a milling machine in the layer where the channel is to be formed.

As shown in FIG. 3, after the base layer 107 is constructed (for example, elevation is about 10 cm below final elevation), a channel is cut into it using a milling machine (for example, a fine-toothed milling machine) to create a recess in which the wireless power transfer transmitter system will be constructed. The base layer 107 is an upper base layer, and the base layer 107 can be considered as a layer where the channel is shaped. The depth of the channel is selected to match the thickness of magnetizable asphalt mixture plus the thickness of the holder to which the transmitter coil is attached in the case where the holder is to remain in the pavement or the depth is selected to match the thickness of the magnetizable asphalt mixture plus the thickness of the transmitter coil in the case where the holder is removed after the transmitter coil assembly is installed or the transmitter coil is installed without a holder plus the thickness of the power cable(s) which run underneath the transmitter coil.

Use of a milling machine to create a channel ensures that the thickness of base asphalt mixture remaining in the bottom of the channel is uniformly compacted (see the portion circled by a letter S in FIG. 3). If a channel is created by placing a reduced thickness of asphalt mixture where the wireless power transfer transmitter system will be placed, the asphalt mixture below the transmitter assembly will not be compacted sufficiently and will be subject to degradation from water (stripping of asphalt binder coating from aggregates) and freeze-thaw (disintegration of the asphalt mixture). As a result, the material supporting the wireless power transfer transmitter system will degrade and cause premature failure of the wireless power transfer transmitter system itself.

According to some other embodiments, forming the channel may include paving two parallel strips of an asphalt mixture to form the channel between the two parallel strips on a layer which is lower than the layer where the channel is formed.

Figure 5A:
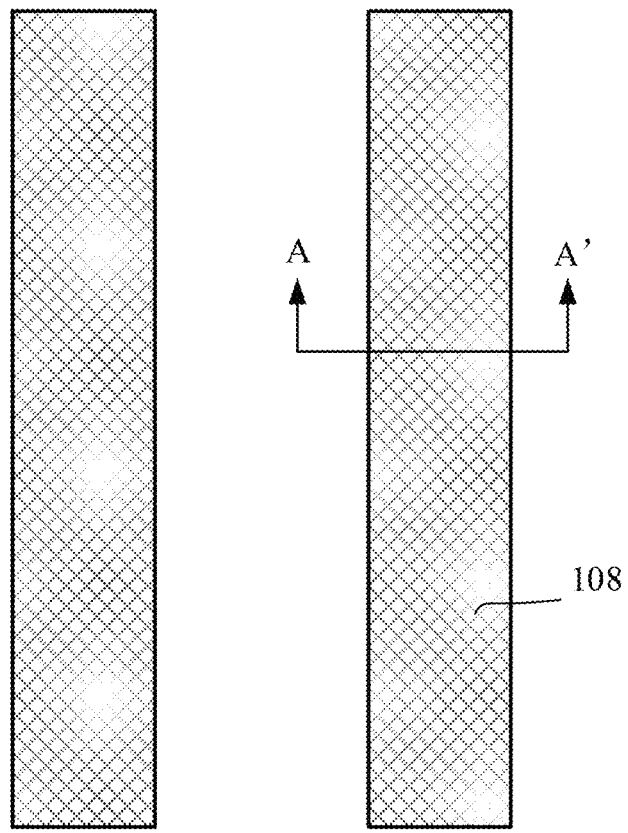
FIG. 5A shows an example of two narrow strips of asphalt mixture.
Figure 5B:
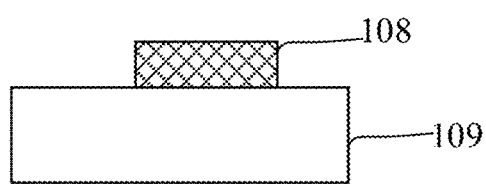
FIG. 5B shows a cross-sectional view taken along A-A' in FIG. 5A.

For example, as an alternative method, the channel of the wireless power transfer transmitter system may be formed by selecting the thickness of the base layer to be equal to the thickness of the wireless power transfer transmitter system (magnetizable asphalt mixture plus transmitter coil assembly). In this case the usual 3.6-meter paving width would be replaced with two narrow strips of asphalt mixture to leave the channel. FIG. 5A shows an example of two narrow strips of asphalt mixture. FIG. 5B shows a cross-sectional view taken along A-A' in FIG. 5A. As shown in FIGS. 5A and 5B, the two parallel strips 108 of an asphalt mixture (the asphalt mixture may be conventional asphalt mixture rather than the magnetizable asphalt mixture) are paved on a layer 109, and the layer 109 is lower than the layer (the layer 107) where the channel is formed.

This approach may require that a smaller Nominal Maximum Sized asphalt mixture is used for this layer. Special considerations must be taken to assure satisfactory long-term performance of the asphalt mixture adjacent to the transmitter coil assembly.

In typical asphalt mixture paving special attention is typically required during compaction at an unconfined edge to prevent early deterioration of the asphalt mixture. At an unconfined edge asphalt mixture is not confined by an adjacent material such as a layer of asphalt mixture already paved or a curb. As a result, the outside edge of asphalt mixture will tend to displace laterally and a strip about 15 to 20 cm wide will have higher air voids than the internal portions of the compacted asphalt mixture. These higher air voids allow for accelerated embrittlement of the asphalt binder, water intrusion and freeze-thaw damage. In normal asphalt pavements this deterioration occurs at the edge of a lane, away from the traffic loads, since an unconfined edge only occurs at the edge of a driving lane.

Creating a channel for the wireless power transfer transmitter system in the center of the lane by paving two strips on either side results in an unconfined edge on either side of the wireless power transfer transmitter system and hence two locations for premature pavement failure.

For addressing such issue, paving of the two parallel strips may include: paving the two parallel strips each of which has a first width; compacting the two parallel strips; and removing an edge portion of each of the two parallel strips to make each of the two parallel strips be a desired width, where the desired width (W2) is smaller than the first width.

Figure 5C:
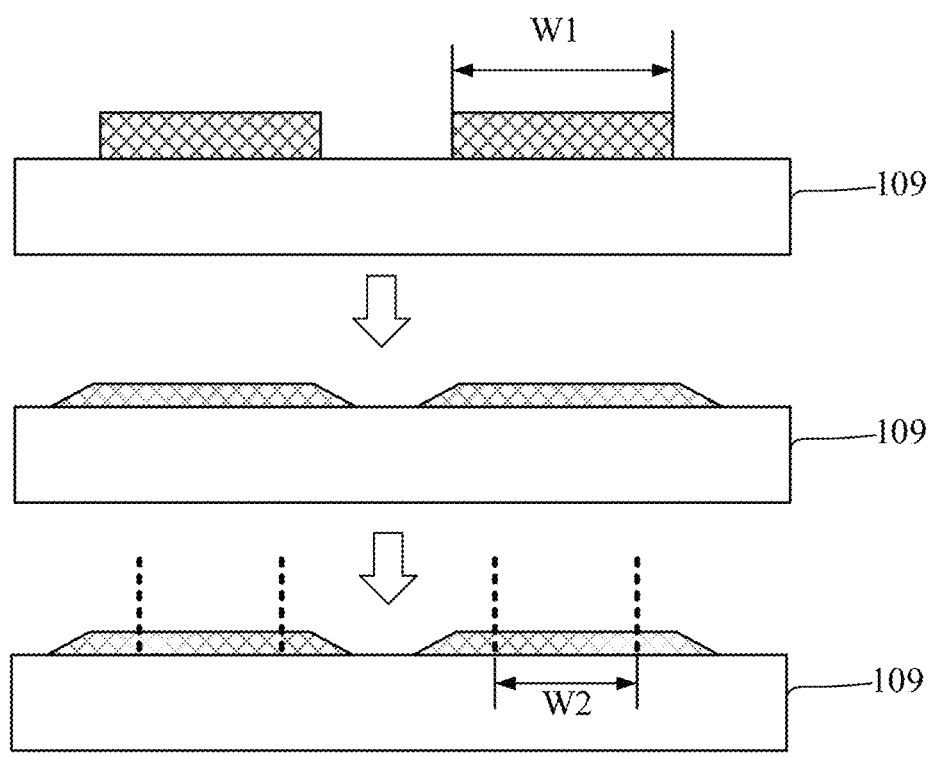
FIG. 5C shows an example of compaction and cutting of two narrow strips.

That is, each strip is paved wider than necessary. For example, each strip is paved about 15 to 20 cm wider than necessary. As shown in FIG. 5C, each of the two parallel strips is paved to have a first width W1. After compaction, the edge portion of each strip will have higher air voids than the internal portion. Then, the strip of high air void material is removed using a cutting wheel or a milling head. The strip after removal of the high air void material (i.e., the edge portion) can be of the desired width W2 which is smaller than the first width W1.

According to some other embodiments, forming the channel may include: attaching a material at a position where the channel is to be formed, and forming an asphalt mixture on both sides of the material, compacting the asphalt mixture and removing the material after compaction to leave the channel. The material where the channel is to be formed may be either compressible or non-compressible.

For example, as another alternative method, a block of an appropriately compressible material (or in other words, void material) such as a foam board or other void-containing material may be attached on the surface to be paved. This compressible material would be removed after paving, leaving the channel of the wireless power transfer transmitter system. The material would be sufficiently compressible to conform with the adjacent asphalt mixture as it is compacted by a compactor such as rollers. At the same time, it would be sufficiently stiff to provide confinement, preventing lateral displacement of the adjacent asphalt mixture which would result in high air voids.

A normal asphalt paver may place hot asphalt mixture across the lane width. The screed of the paver will ride on top of a mold. The compressible material is adhered to the paving surface to prevent displacement (dragging) under the paver. Hot asphalt mixture is deposited on either side of the mold. Rollers compact the mixture using normal rolling patterns, ignoring the presence of the compressible material.

In another alternative method, the material placed where the channel is to be formed may be non-compressible. The non-compressible material is adhered to the paving surface to prevent displacement (dragging) under the paver. In this case the paver would place hot asphalt mixture thicker than the height of the non-compressible material such that the excess height allows for the decrease in thickness during the compaction process.

After paving, the compressible or non-compressible material is removed, leaving the channel in which the magnetizable asphalt mixture will be placed.

Once the channel is made, the magnetizable asphalt mixture is placed in the prepared channel as shown in FIG. 1. The magnetizable asphalt mixture may have a typical thickness of 50 mm after compaction. Magnetizable asphalt mixture is placed in the channel approximately 10% thicker than the final compacted thickness, in this case 55 mm as placed, 50 mm as compacted. A specialized screed is used that uses the surface elevation of the adjacent asphalt base mixture as a reference plane.

After the magnetizable asphalt mixture is placed in the channel, a pre-manufactured transmitter coil assembly including a transmitter coil and holder is placed in the magnetizable asphalt mixture. A lateral cross section (taken along K-K' line in FIG. 2C) of the holder and the embedment of the transmitter coil in the holder is shown in FIG. 2A. A longitudinal cross section view of the transmitter coil and the holder is shown in FIG. 2B. A plan view of the transmitter coil and holder viewed from the underside of the holder is shown in FIG. 2C. The transmitter coil may be made with either copper tubes or Litz wire, and embodiments of the present disclosure do not impose specific limitations on this. The transmitter coil made with copper tubes will be used as an example in the following description. The shape of the transmitter coil may be a Double-D arrangement as shown in FIG. 2A to FIG. 2C or may be another pattern as is specific to the transmitter arrangement.

As shown in FIG. 2B, a portion of the transmitter coil 1031 is elevated above the holder 1032 where tubes of the transmitter coil 1031 need to cross over each other. This elevated portion of the transmitter coil 1031 is called a bridge. The reference number 1033 indicates the position of a bridge, and the bridge may be covered by a protection cap as discussed later. The bridge can be designed to be either below the plane of the transmitter coil 1031, as shown, or above it. As shown in FIG. 2C, the location of the bridges is evident where the tubes of the transmitter coil 1031 pass over each other.

The thickness of the holder 1032 may be determined by the diameter of the copper tubes plus the thickness of an electrical insulating layer on the outside of the tubes and the desired thickness of laminated asphalt felt above the tubes.

As an example, if the tubes are 25 mm in diameter, and the electrical insulating layer is 2.5 mm thick, then a recess in the holder (the recess is used to install the transmitter coil) will be 15 mm, half the outside diameter of the insulated transmitter coil. The distance from the holder to top of the bridges may be 15 mm plus 30 mm, a total of 45 mm. For a particular case, this arrangement will allow the transmitter coil to be embedded 50 percent of its diameter into the magnetizable asphalt mixture. The desired embedment is between 0 and 90 percent of the transmitter coil diameter.

The holder 1032 may be made of a material which when heated, will realize bonding with the magnetizable asphalt mixture below the holder and with a surface layer covering the pre-manufactured transmitter coil assembly. As shown in FIG. 1, the holder 1032 serves to protect the transmitter coil 1031 installed in the holder 1032 to prevent the transmitter coil 1031 from potential damages in subsequent processes (such as compaction). Thus, the material of the holder 1032 may be of proper stiffness to play the role of protection. Also, after the transmitter coil assembly is placed, a surface layer is formed to cover the transmitter coil assembly, and the holder 1032 needs to ensure the bonding between the holder 1032 and the surface layer. The surface layer is generally formed by placing hot asphalt mixture, and when the hot asphalt mixture is placed over the holder 1032, the material of the holder 1032 may be heated to ensure bonding between the surface layer and the holder 1032.

For example, the holder 1032 may be made of laminated asphalt-saturated felt layers. Each layer includes a substrate that has been dipped in asphalt binder. Properties of the asphalt binder are selected to ensure bonding occurs within the laminated asphalt saturated felt layers as well as the magnetizable asphalt below the holder and the surface layer above the holder. The holder 1032 is made by laminating layers of asphalt-saturated felt to provide the desired thickness. A recess of the appropriate depth and geometry is made in the laminated holder 1032 into which the transmitter coil 1031 is placed.

Alternatively, the holder 1032 may be made of another material or layers of another material such as lignin, plastic or epoxy, etc., and may be bonded with a non-crystalline adhesive as long as such material and adhesive can realize the protection and bonding functions.

The holder 1032 extends beyond the size of the transmitter coil 1031, as shown in FIG. 2A to FIG. 2C. Typically, the holder 1032 may be about 5 cm wider than the transmitter coil 1031. For dynamic charging the length of the holder 1032 may depend on the distance between transmitter coils along the length of the roadway. Generally, transmitter coils are spaced 30 to 60 cm apart and the holder should ideally be continuous in which case the holder 1032 may be up to 30 to 60 cm longer than a transmitter coil 1031 installed in the holder 1032. For static charging, the holder 1032 only needs to be 10 cm longer than the coil 1031.

As mentioned above, in another embodiment, the coil holder may be used during installation of the transmitter coil and after the transmitter coil is bonded at the appropriate depth into the magnetizable asphalt mixture the holder is removed. In this embodiment, the purpose of the holder is to ensure geometric stability of the transmitter coil during coil installation after which the coil holder can be removed. Or, in yet another embodiment, the transmitter coil may be installed into the magnetizable asphalt without a coil holder. That is, the holder may not be used during installation of the transmitter coil. In these two embodiments the transmitter coil can be protected from construction of the layers above it. A protection mixture may be placed on the top of the transmitted coil. For example, the protection mixture is micro-surfacing or sand mixture. The micro-surfacing or sand mixture may be placed on the top of the transmitter coil and used to fill spaces between the transmitter coil. Micro-surfacing is an asphalt mixture including small aggregate particles, generally less than 5 mm maximum size mixed with an emulsified asphalt binder. Sand mixture is a hot asphalt mixture containing small aggregate particles, generally less than 5 mm, mixed with an asphalt binder. Such mixtures or other similar materials protect the transmitter coil from deformation and the insulating material on the transmitter coil from larger aggregates in the surface mixture that might cut or partially cut through the insulating material on the transmitter coil.

Figure 8:
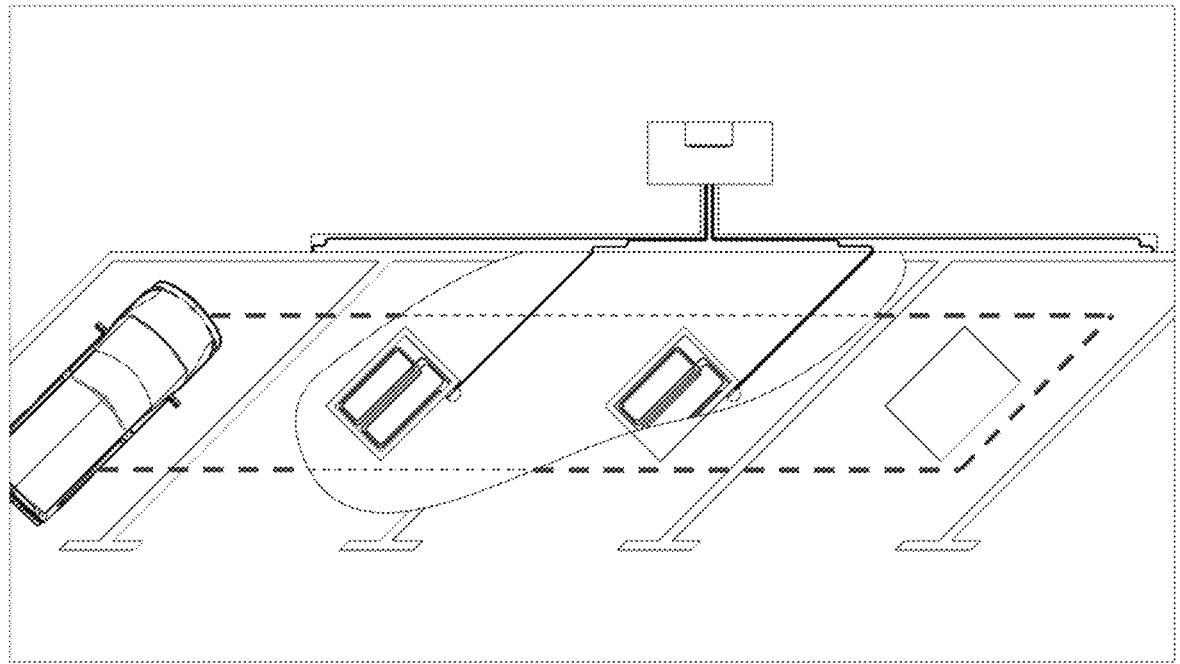
FIG. 8 schematically shows the location of wireless power transmitter systems for static charging according to another embodiment of the present disclosure.

In a parking lot where transmitters are installed to provide static charging for parked vehicles the channel in which the pre-manufactured transmitter coil assembly or the pre-manufactured transmitter coil will be placed may be constructed as shown in FIG. 8. The channel may be constructed by a fine-toothed milling machine that is plunged into the base layer. The length of the channel may be selected to accommodate one or more transmitter coil assemblies or one or more transmitter coils. Each parking location may contain a separate channel. This channel may also be formed by paving parallel strips of an asphalt mixture to form the channel between the two parallel strips or, as another alternative method, a block of appropriately compressible material may be attached before paving and removed after paving to preserve the space for the transmitter coil assemblies or transmitter coils as discussed earlier. Specifically, the compressible or non-compressible material is attached at a position where the channel is to be formed, an asphalt mixture is formed around the compressible or non-compressible material, the asphalt mixture is compacted and the compressible or non-compressible material is removed after compaction to form the channel.

In a parking lot cables for the transmitter coils may run along the head of the parking spaces and enter into the parking space to connect to the transmitter coils in FIG. 8.

For static charging, the time during which power transfer happens is long enough to generate excessive heat in the transmitter coil assembly(assemblies) or transmitter coil(s), and therefore heat dissipation may be required to reduce the temperature of the coil assembly(assemblies)/transmitter coil(s) and the surrounding asphalt mixture. According to the geographic location of the transmitter installation and properties of the paving materials typically used in such location it will be desirable to prevent the temperature of the magnetizable asphalt mixture (and possibly the surface layers) rising above normal maximum pavement surface temperature for that location. As a reference the maximum pavement surface temperature can range from 50° C. in a cool climate to 75° C. in a hot desert climate. The amount of heat generated by the transmitter coil assembly(assemblies) or transmitter coil(s) will be dependent upon the power rating of the coil assembly(assemblies) or transmitter coil(s), length of time operating and other design considerations.

Figure 9:
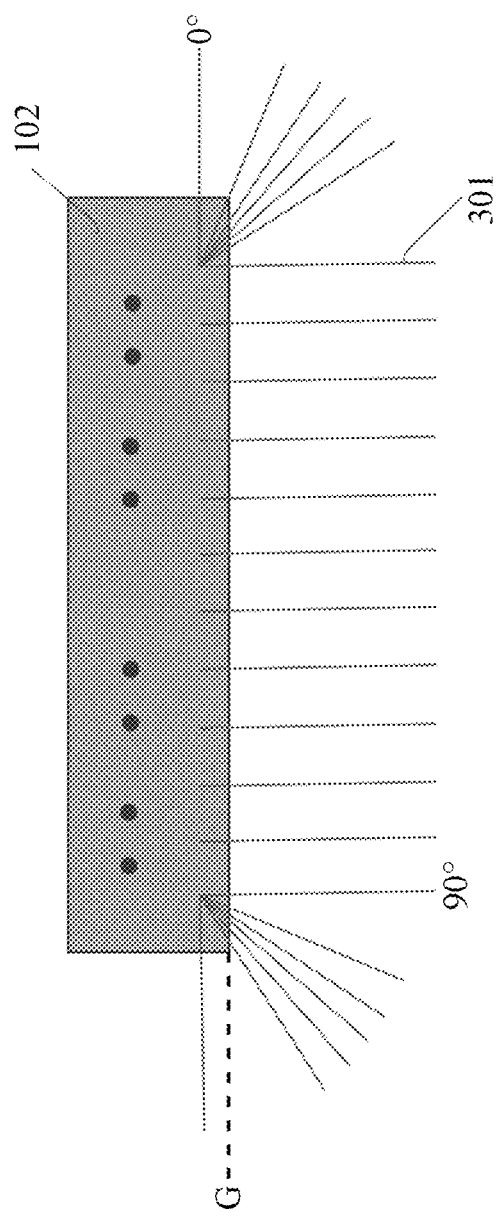
FIG. 9 schematically shows a passive cooling scheme according to an embodiment of the present disclosure.

Heat dissipation may be either active or passive. Passive heat removal may be accomplished using one or more heat pipes that take advantage of the temperature differential between the magnetizable asphalt mixture and the soil surrounding or underneath the coil assemblies or the coils. A heat pipe may include a container tube lined with a wick that is filled with a liquid that evaporates and condenses according to the temperature difference. For a particular embodiment of the coil assembly or coil with passive cooling, the one or more heat pipes 301 are installed as shown in FIG. 9. The heat pipes 301 may be embedded into the magnetizable asphalt mixture 102 and driven into surrounding ground at an angle. The angel is an angle between an extension direction of a heat pipe and a plane (as indicated by the letter G in FIG. 9) where a bottom surface of the channel is located. For example, the heat pipes may be installed vertically into the ground below the coil assemblies, or the coils as shown in FIG. 9 (i.e., the angle is 90 degrees) or may be installed horizontal (i.e., the angle is zero degrees).

Figure 10:
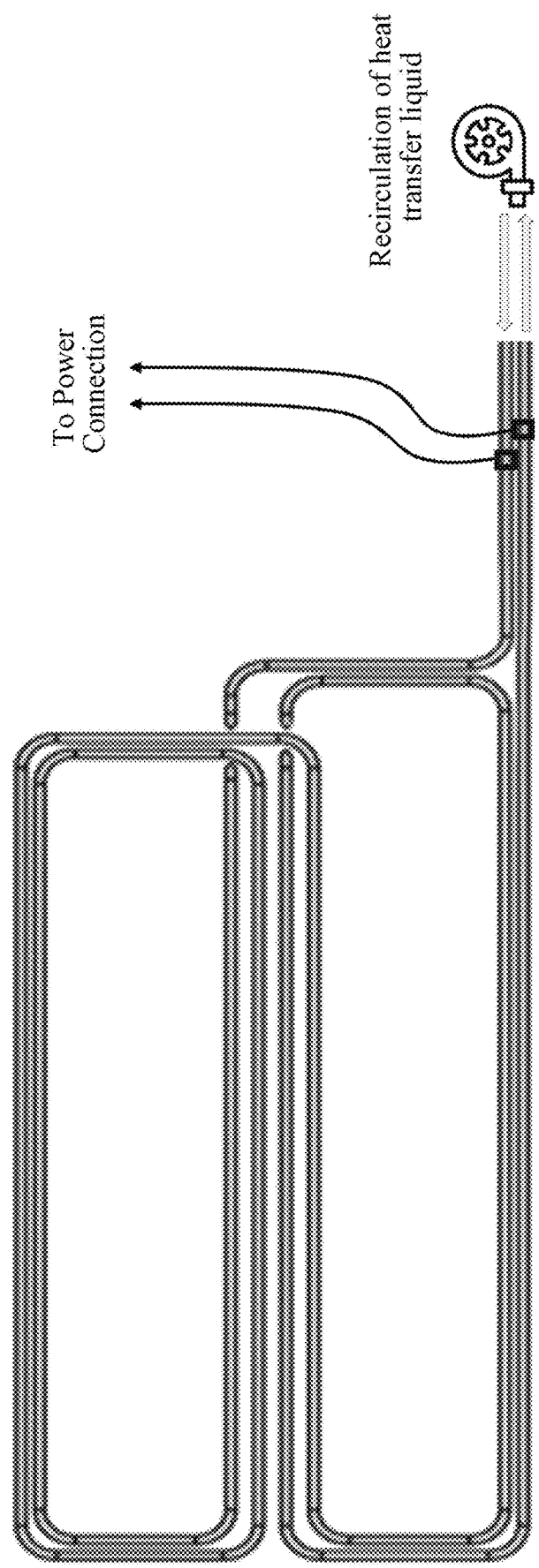
FIG. 10 schematically shows an active cooling scheme according to an embodiment of the present disclosure.

Alternatively, active heat removal may be accomplished when using the tubes of the transmitter coil both for heat transfer and wireless power transfer. Active cooling may be accomplished by circulating a heat transfer fluid. A particular embodiment for active cooling may take advantage that the coil is made of hollow tubes, to create a closed-circuit cooling system within the transmitter coil by pumping a fluid through the coil as seen in FIG. 10. This liquid can be water or a specific solution of another appropriate liquid. The heat transfer fluid may be pumped into the heat transfer coil and out from the heat transfer coil as shown by two arrows in FIG. 10. The transmitter coil is connected to power as shown by two black squares in FIG. 10. In the embodiment, the transmitter coil serves a dural purpose: a) generating a high frequency magnetic field to transfer power wirelessly to a receiver on a stationary or moving vehicle; and b) circulating a cooling fluid to reduce the temperature of the transmitter coil.

Figure 6A:
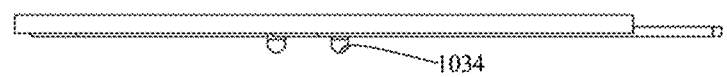
FIG. 6A to 6C schematically shows a protection cap attached to the bottom side of a holder according to an embodiment of the present disclosure.
Figure 6B:
Figure 6C:
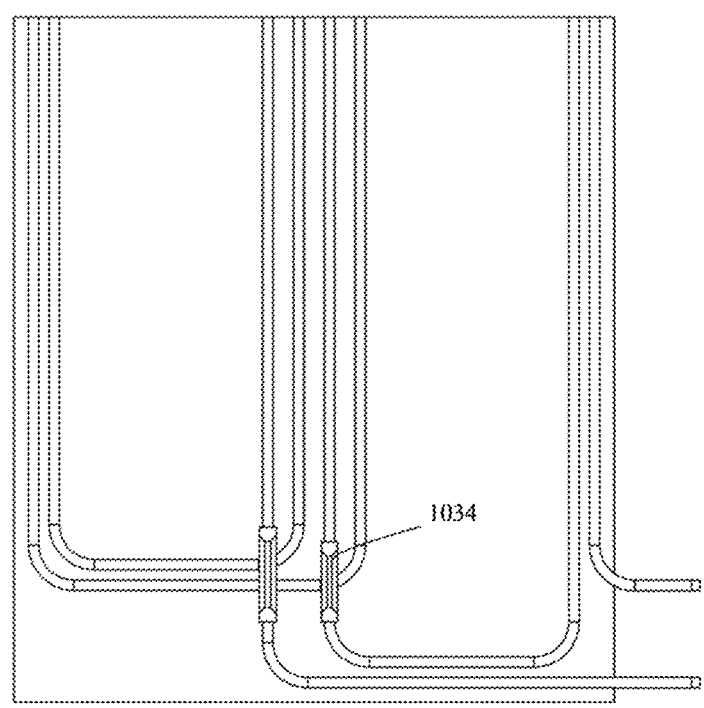

FIG. 6A schematically shows a protection cap attached to the bottom side of the holder to protect the bridge during the compaction process (the covered bridge is shown in FIG. 2A, FIG. 2B and FIG. 2C). A cross-sectional view of the protection cap is shown in FIG. 6B. A plan view of the protection cap viewed from the underside of the holder is shown in FIG. 6C. One or more protection caps 1034 may be arranged to protect the bridges. The protection caps 1034 may be formed using a non-metallic material resistant to the installation temperature of hot asphalt mixture (approximately 165° C.). The inside of the protection caps 1034 is filled with an epoxy or other similar material that completely fills the voids between the caps and the holder to prevent intrusion of water after the transmitter coil is installed.

The pre-manufactured transmitter coil assembly is placed on top of the magnetizable asphalt mixture with the transmitter coil facing downward in contact with the freshly placed magnetizable asphalt mixture. An asphalt compactor (e.g., roller) on top of the transmitter coil assembly embeds the transmitter coil the desired depth into the magnetizable asphalt mixture and compacts the magnetizable asphalt mixture.

When the holder and the transmitter coil are compressed into the freshly placed magnetizable asphalt mixture, the transmitter coil will be embedded into the magnetizable asphalt mixture to the desired depth between 0 and 90 percent of the transmitter coil diameter. The thickness of the holder and the magnetizable asphalt mixture are selected such that the installation is complete when the holder is rolled flush with the top of the adjacent base layer 107. This process ensures that a complete bonding occurs between the holder and the transmitter coil with the magnetizable asphalt mixture.

In an alternative embodiment where the transmitter coil holder is removed, the void left after removal of the holder may be filled with a protection mixture such as micro-surfacing or sand mixture. In another embodiment where the transmitter coil is placed in a pre-stamped depression in the magnetizable asphalt mixture without use of a holder the depth of the channel is selected such that an appropriate thickness of micro-surfacing or sand mixture can be placed to protect the transmitter coil and be flush with the top of the channel.

Figure 7:
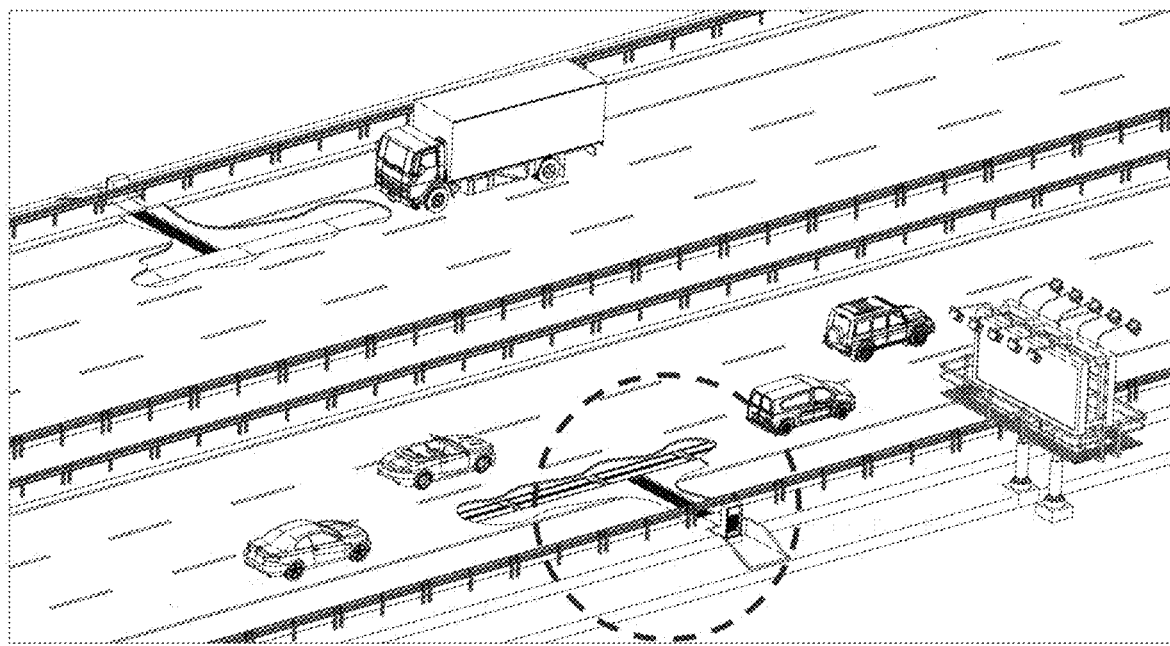
FIG. 7 schematically shows the location of wireless power transfer transmitter systems according to an embodiment of the present disclosure.

FIG. 7 shows the location of wireless power transfer transmitter systems for dynamic charging, in this case along the outside lane of a multi-lane highway. A power supply box feeds power to several wireless power transfer transmitter systems upstream and downstream. Each wireless power transfer transmitter system may have at least one power cable, e.g., two power cables (or other number of power cables). The location of the power cables may be shown in the circle in FIG. 7.

FIG. 8 shows the location of wireless power transmitter systems for static charging, in this case in a parking lot. The power supply system may provide power to several transmitter pads and each transmitter pad may have at least one power cable, e.g., two power cables (or other number of power cables).

Figure 11:
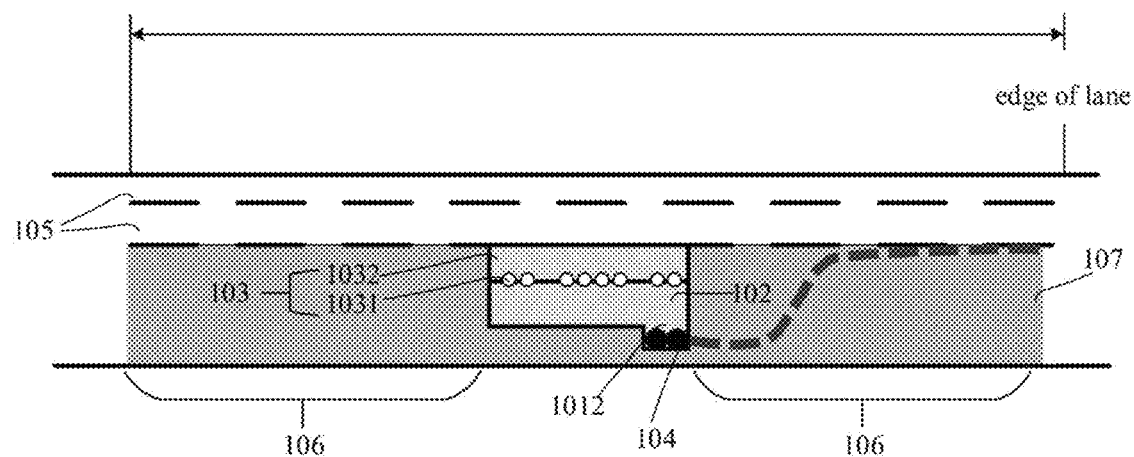
FIG. 11 schematically shows a cross-sectional view of the wireless power transfer transmitter system according to an embodiment of the present disclosure.

FIG. 11 is a cross-sectional view of the wireless power transfer transmitter system, in which the location of the power cables is shown. The wireless power transfer transmitter system may further include at least one power cable 104. The transmitter coil 1031 is connected to the at least one power cable 104 so that the transmitter coil 1031 can receive power from the at least one power cable 104. The at least one power cable 104 may be connected to a power source (not shown). In this example, the at least one power cable 104 includes two power cables.

The power cables 104 may be placed at the bottom of the channel. When forming the channel, a recess may be formed at a bottom of the channel along one side of the channel. For example, the bottom of the channel may cut deeper along one side of the channel using for example a milling machine to create a recess 1012 downward at the bottom of the channel, providing space for the power cables 104. The power cables 104 may be bound together into a flat arrangement that is one cable high and multiple cables wide. Binding the cables 104 together ensures that no void spaces exist among the cables where air or water could make ingress.

After the channel is formed, the power cables 104 are installed at the bottom of the channel, and then the magnetizable asphalt mixture 102 is formed in the channel. That is, the power cables are underneath the magnetizable asphalt mixture 102. When the magnetizable asphalt mixture 102 is compacted, voids or space formed between the power cables 104 and the bottom surface of the channel or voids or space formed between the power cables 104 and the magnetizable asphalt mixture 102 can be avoided, thereby preventing air or water ingress.

Figure 12:
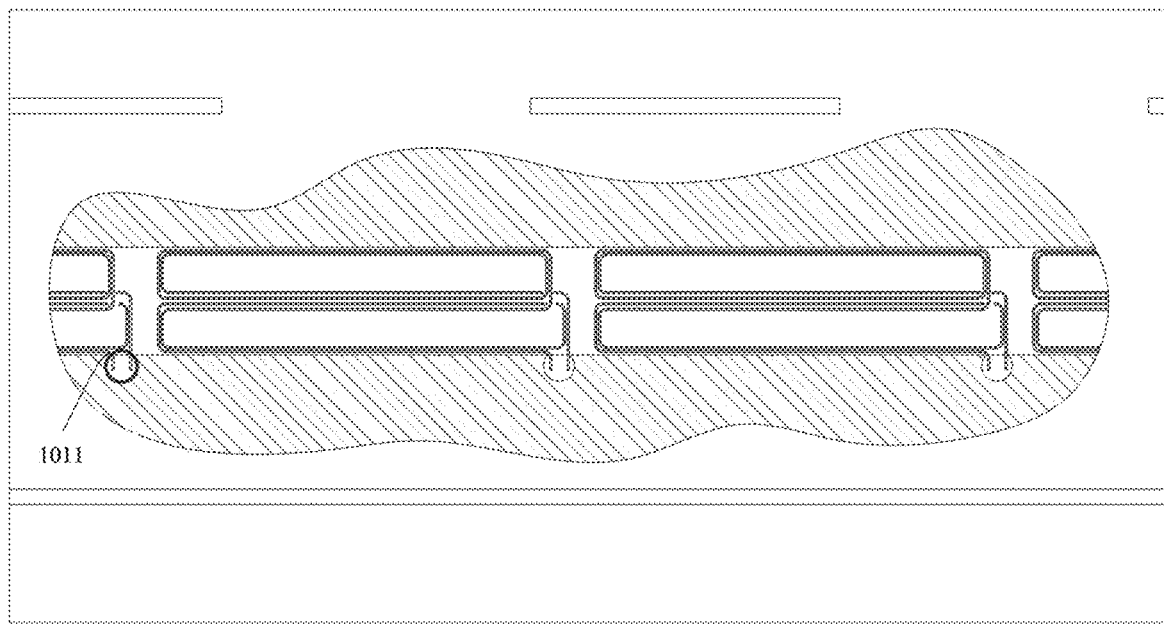
FIG. 12 schematically shows an example location of a hole for connection between a transmitter coil and power cables.

FIG. 12 shows two adjacent wireless power transfer transmitter systems. A hole 1011 (e.g., having a diameter of 15 cm) is cut at an edge of the channel. Connection points for the transmitter coils are located in the hole. At each connection point a pair of power cables are moved laterally into the 15 cm hole 1011. After the power cables are placed, the magnetizable asphalt mixture is placed in the channel.

Two different processes may be considered to install the transmitter coil assembly before placing the surface mixture: 1) the transmitter coil assembly is used to compact the fresh magnetizable asphalt mixture, or 2) the fresh asphalt mixture is compacted and stamped with the pattern of the transmitter coil into which the transmitter coil is installed.

According to an embodiment, placing the pre-manufactured transmitter coil assembly in the magnetizable asphalt mixture, includes:
- placing the pre-manufactured transmitter coil assembly on top of freshly formed magnetizable asphalt mixture; and
- compacting the pre-manufactured transmitter coil assembly and the magnetizable asphalt mixture using a compactor, e.g., a conventional asphalt compactor.

Specifically, the transmitter coil assembly is placed on top of the fresh magnetizable asphalt mixture. A compactor (a compacting device for carrying out compaction process, e.g., roller) is used to seat the holder and transmitter coil into the magnetizable asphalt mixture. At the same time the magnetizable asphalt mixture is compacted to the desired density.

According to another embodiment, placing the pre-manufactured transmitter coil assembly in the magnetizable asphalt mixture, includes: placing a compactor on top of freshly formed magnetizable asphalt mixture to compact the magnetizable asphalt mixture, wherein the compactor is the same length and width as the holder, a vibrator is attached to top of the compactor, and a bottom face of the compactor is shaped to leave a transmitter coil pattern in the compacted magnetizable asphalt mixture that is a mirror pattern of the transmitter coil; removing the compactor; and placing the pre-manufactured transmitter coil assembly into the transmitter coil pattern left by the compactor.

The bottom face of the compactor may be heated or may coated with a release agent to prevent adhesion of the freshly placed magnetizable asphalt mixture.

The compacting device is removed leaving the pattern of the transmitter coil embossed into the magnetizable asphalt mixture; and the pre-manufactured transmitter coil assembly is placed into the pattern of the transmitter coil stamped by the compactor.

Figure 13A:
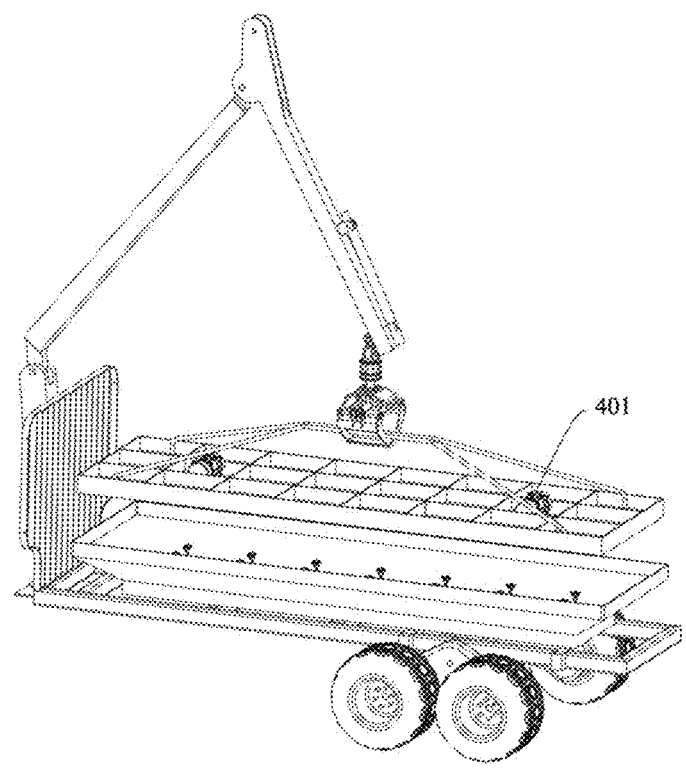
FIG. 13A and FIG. 13B shows placing a pre-manufactured coil assembly by vibration and spray mechanisms for on-site construction according to an embodiment of the present disclosure.
Figure 13B:
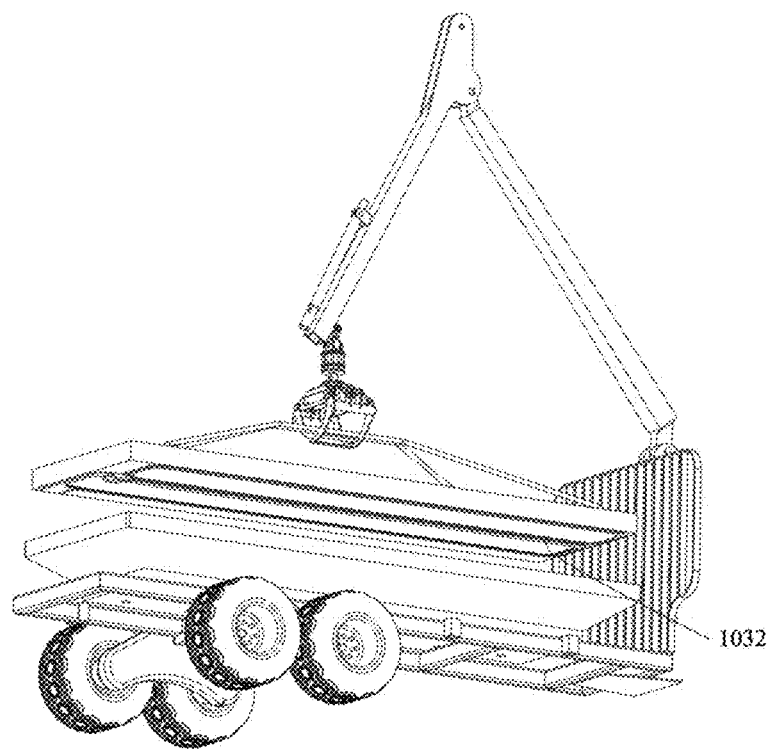

Specifically, a compactor is placed on top of the fresh magnetizable asphalt mixture. This compactor is the same length and width as the holder as shown in FIG. 13A. Attached to the top of the compactor are vibrators 401 that apply vibratory compressive forces with preferentially selected frequency and amplitude to efficiently to compact the magnetizable asphalt mixture without causing damage to the ferrite particles. The bottom face of the compactor is shaped to leave a pattern in the compacted magnetizable asphalt mixture that is a mirror image of the transmitter coil. The bottom face may be heated and coated with a release agent to ensure that none of the magnetizable asphalt mixture sticks to the bottom of the compactor. After stamping with the pattern of the transmitter coil, the holder and the transmitter coil are placed on the prepared surface, as shown in FIG. 13B.

In another embodiment, the compacting device for the magnetizable asphalt mixture may be a roller with a raised image (or called an embossed pattern) 601 (see FIG. 14) that leaves a stamped impression on the surface of the compacted magnetizable asphalt mixture into which the transmitter coil or transmitter coil assembly is placed. The roller may be self-propelled or may be towed and operate with vibration devices that operate at preferentially selected frequency and amplitude.

Figure 15:
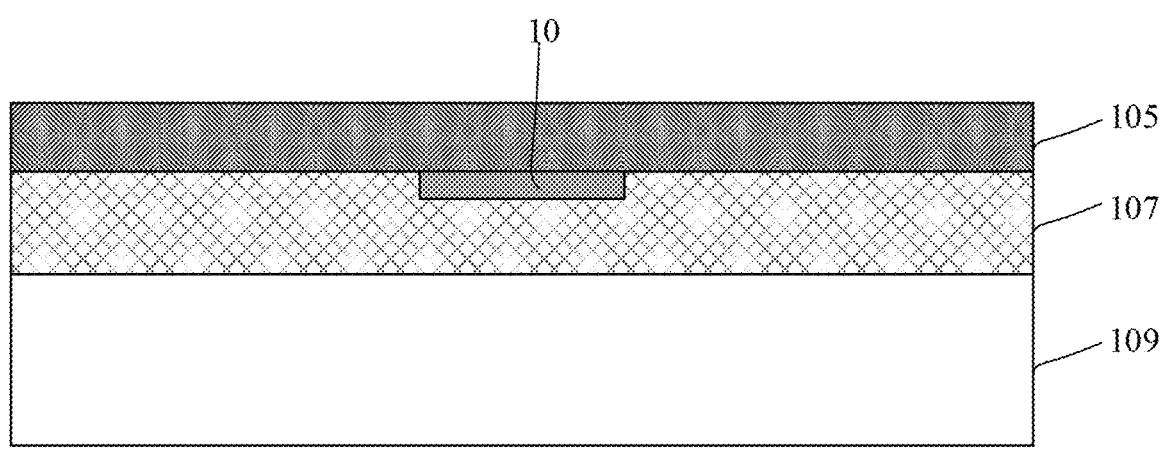
FIG. 15 is a schematic diagram showing cross section of a lane for typical new asphalt pavement with embedded wireless power transfer transmitter system.

According to some embodiments, the above provided construction methods and wireless power transfer transmitter system may be used to construct a new asphalt pavement. FIG. 15 is a schematic diagram showing cross section of lane for typical new asphalt pavement with embedded wireless power transfer transmitter system.

A typical asphalt pavement is constructed sequentially in layers placed on a prepared base. The wireless power transfer transmitter system 10 is installed in the second or third layer (e.g., layer 107) from the surface. Surface layer(s) 105 and lower layer(s) 109 may be placed over and below the layer 107 where the wireless power transfer transmitter system 10 is arranged. The thickness of the wireless power transfer transmitter system 10 may be the same thickness as the layer 107 it is installed within, or it may be thicker or thinner than the layer 107. The wireless power transfer transmitter system width may vary from 0.3 to 1.5 meters and length from 1.0 to 5.0 meters.

Figure 16:
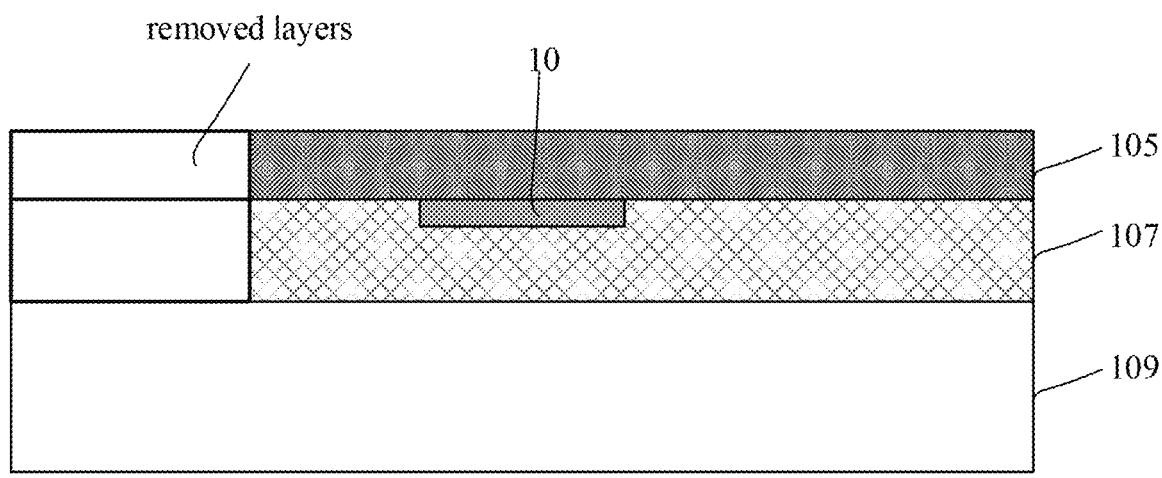
FIG. 16 is a schematic diagram showing cross section of asphalt pavement rehabilitated by removing layers and replacing with new layer(s) containing embedded wireless power transfer transmitter system.

According to some other embodiments, the above provided construction methods and wireless power transfer transmitter system may be used in an existing asphalt pavement. FIG. 16 is a schematic diagram showing cross section of asphalt pavement rehabilitated by removing layers and replacing with new layers containing embedded wireless power transfer transmitter system.

An asphalt pavement is typically rehabilitated by the addition of new asphalt layer(s) on top of the existing pavement. One or more existing layers can be removed before the new layers are placed.

If the existing surface layer(s) of the pavement is removed by milling, or if it is not removed, the layer containing the wireless power transfer transmitter system is placed on the milled surface or existing surface. The technique to construct the layer containing the wireless power transfer transmitter system on top of the existing pavement is the same technic used for new asphalt pavement. As shown in FIG. 16, a replacement layer 107 containing the wireless power transfer transmitter system 10 and replacement surface layer(s) 105 are formed on the lower layer(s) 109 to replace the removed layers.

According to some other embodiments, wireless power transmission systems may be installed in new or existing pavements of parking lots.

In new parking lot pavements, the conventional asphalt mixtures (the layers 109 and 107) are installed as discussed earlier.

Figure 14:
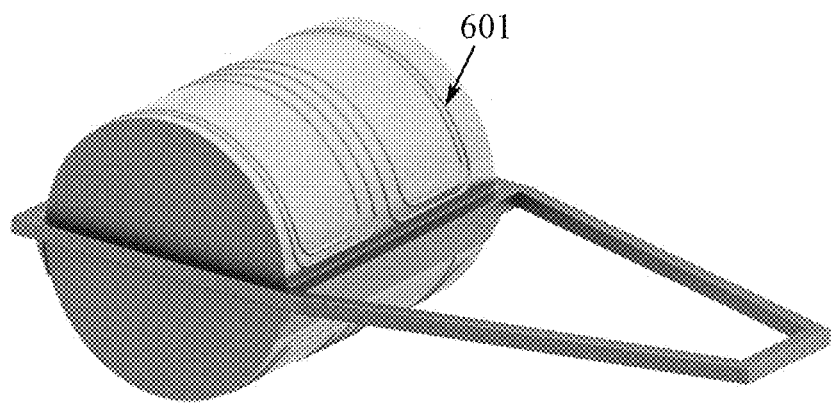
FIG. 14 shows a roller with an inverse design of the coil that can be used to generate an imprint for the coil according to an embodiment of the present disclosure.

In existing parking lot pavements only a portion of the existing surface needs to be removed. Existing surface layers may be removed laterally across parking spaces in FIG. 8 as shown by the dashed lines where transmitter systems are to be installed. The width of the material removed would be preferentially selected based on dimensions of the transmitters to be installed, say 1.5 meters width for a 1.0-meter-long transmitter coil. For both new pavements and existing pavements a channel is formed in each parking space, say using a fine-toothed milling machine, located transversely in the center of the parking space and longitudinally where the receiver antenna of the vehicle will be located, for a particular case this could be 0.75 meters wide and 1.0 meters long. Magnetizable asphalt mixture is installed and compacted in the channel, much the same way as described previously using a compacting device as shown in FIG. 13A and FIG. 13B configured for the size and shape of the transmitter coils on the freshly placed magnetizable asphalt mixture or using a compactor with an embossing face as shown in FIG. 14 to create an embossed pattern into which the transmitter assembly will be placed.

Figure 17:
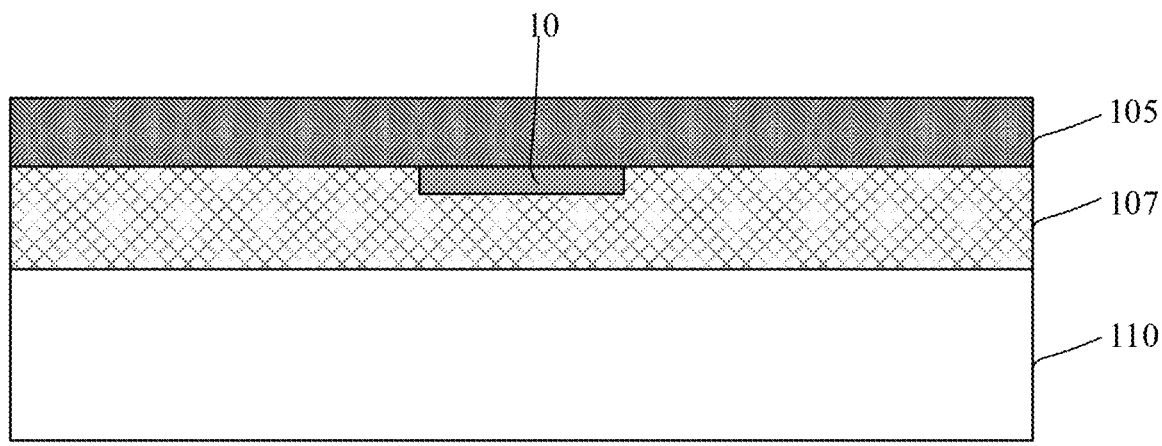
FIG. 17 is a schematic diagram showing cross section of concrete pavement rehabilitated by adding asphalt layer(s) containing embedded wireless power transfer transmitter system.

According to some other embodiments, the above provided construction methods and wireless power transfer transmitter system may be used in an existing rehabilitated concrete pavement that has an asphalt overlay. FIG. 17 is a schematic diagram showing cross section of concrete pavement rehabilitated by adding asphalt layers containing embedded wireless power transfer transmitter system.

A concrete pavement may be rehabilitated by the addition of asphalt layer(s) on top of the existing pavement. The wireless power transfer transmitter system is installed in the second or third asphalt layer from the surface. The thickness of the wireless power transfer transmitter system may be the same thickness as the layer it is installed within, or it may be thinner. The width of the wireless power transfer transmitter system will vary from 0.3 to 1.5 meters and length of the wireless power transfer transmitter system ranges from 1.0 to 5.0 meters. As shown in FIG. 17, an overlaid layer 107 containing the wireless power transfer transmitter system 10 is formed on an existing concrete layer 110. Overlaid surface layer(s) 105 are overlaid on the layer 107.

In the embodiments of the present disclosure, in-place construction of a wireless power transfer transmitter system and the wireless power transfer transmitter system formed using such construction methods are provided. As described above, the in-place construction involves multiple processes, and the wireless power transfer transmitter system is an inclusion of a dissimilar material within the pavement structure. How to prevent early deterioration of the pavement caused by installation of the dissimilar material within the pavement structure is a problem needs to be considered and solved.

In the in-place construction, the holder can serve to protect the transmitter coil and realize bonding with both the surface layer and the magnetizable asphalt mixture, to ensure proper bonding between the pre-manufactured transmitter coil assembly and surrounding layers or material. Thus, early deterioration of the pavement can be avoided.

Further, the power cables are formed at the bottom of the channel, and then the magnetizable asphalt mixture is formed in the channel. Subsequent compaction of the magnetizable asphalt mixture can avoid voids or space formed between the power cables and the bottom surface of the channel or voids or space formed between the power cables and the magnetizable asphalt mixture, thereby preventing air or water ingress. Further, a hole is cut at the edge of the channel to enable the power cables to move laterally to be connected with the transmitter coil.

Also, the above methods for forming channel and placing the pre-manufactured transmitter coil assembly provide practical construction solutions. Thus, an inductive power transmitter for wireless power transfer using an asphalt mixture with a high-volume fraction of ferrite to provide power transfer to vehicles while parked or during motion can be realized.

It should be noted that although some sizes or dimensions are labeled in drawings, such sizes or dimensions are only illustrative, and should not be construed as constituting any limitation on the present disclosure. Further, the figures are not necessarily drawn to scale, and for convenience of description, some parts in the figures may be illustrated in an exaggerated manner.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A construction method of an asphalt pavement that comprises a wireless power transfer transmitter system, comprising:
   forming a channel in a layer of a drivable civil structure;
   forming a magnetizable asphalt mixture in the channel, wherein the magnetizable asphalt mixture comprises an asphalt binding substance and particles, some or all of which are magnetizable; wherein a percentage of the particles in the magnetizable asphalt mixture is one hundred percent or less; and
   placing a pre-manufactured transmitter coil or a pre-manufactured transmitter coil assembly in the magnetizable asphalt mixture, wherein the pre-manufactured transmitter coil assembly comprises a transmitter coil and a holder, a part of the transmitter coil is installed in the holder, and 0 to 90 percent of the transmitter coil is embedded in the magnetizable asphalt mixture.

2. The method according to claim 1, wherein the magnetizable asphalt mixture and the pre-manufactured transmitter coil or pre-manufactured transmitter coil assembly are used for dynamic charging to transfer electrical power to a battery of at least one moving vehicle or to an electric motor of at least one moving vehicle;
   wherein forming the channel comprises:
   forming the channel by a milling machine in the layer; or
   paving two parallel strips of an asphalt mixture to form the channel between the two parallel strips on a layer which is lower than the layer where the channel is formed; or
   attaching a compressible or non-compressible material at a position where the channel is to be formed, forming an asphalt mixture on both sides of the compressible or non-compressible material, compacting the asphalt mixture and removing the compressible or non-compressible material after compaction to form the channel.

3. The method according to claim 2, wherein paving the two parallel strips comprises:
   paving the two parallel strips each of which has a first width;
   compacting the two parallel strips; and
   removing an edge portion of each of the two parallel strips to make each of the two parallel strips be a desired width, wherein the desired width is smaller than the first width.

4. The method according to claim 1, wherein the magnetizable asphalt mixture and the pre-manufactured transmitter coil or the pre-manufactured transmitter coil assembly are used for static charging to transfer electrical power to a battery of at least one stationary vehicle;
   wherein forming the channel comprises:
   forming the channel within a parking space by a milling machine; or paving parallel strips, or
   attaching a compressible or non-compressible material at a position where the channel is to be formed, forming an asphalt mixture around the compressible or non-compressible material, compacting the asphalt mixture and removing the compressible or non-compressible material after compaction to form the channel.

5. The method according to claim 1, wherein placing the pre-manufactured transmitter coil assembly in the magnetizable asphalt mixture, comprises:
   placing the pre-manufactured transmitter coil assembly on top of freshly formed magnetizable asphalt mixture; and compacting the pre-manufactured transmitter coil assembly and the magnetizable asphalt mixture using a compactor;

leaving the holder permanently installed, or removing the transmitter coil holder.

6. The method according to claim 1, wherein placing the pre-manufactured transmitter coil or the pre-manufactured transmitter coil assembly in the magnetizable asphalt mixture, comprises:

placing a compactor on top of freshly formed magnetizable asphalt mixture to compact the magnetizable asphalt mixture, wherein the compactor is the same length and width as the holder, a vibrator is attached to the top of the compactor, and a bottom face of the compactor is shaped to leave a transmitter coil pattern in the compacted magnetizable asphalt mixture that is a mirror pattern of the transmitter coil;

wherein when compacting the magnetizable asphalt mixture, the bottom face of the compactor is heated and coated with a release agent;

removing the compactor; and placing the pre-manufactured transmitter coil or the pre-manufactured transmitter coil assembly into the transmitter coil pattern left by the compactor;

leaving the transmitter coil holder permanently installed, or removing the transmitter coil holder.

7. The method according to claim 1, wherein placing the pre-manufactured transmitter coil or the pre-manufactured transmitter coil assembly in the magnetizable asphalt mixture, comprises:

placing a roller on top of freshly formed magnetizable asphalt mixture to compact the magnetizable asphalt mixture, wherein the roller has a raised image of the transmitter coil on a surface of the roller, and compaction using the roller leaves a transmitter coil pattern in the magnetizable asphalt mixture that is a mirror pattern of the transmitter coil;

removing the roller; and placing the pre-manufactured transmitter coil or the pre-manufactured transmitter coil assembly into the transmitter coil pattern the left by the roller leaving the transmitter coil holder permanently installed, or removing the transmitter coil holder.

8. The method according to claim 1, wherein when forming the channel, a recess is formed at a bottom of the channel along one side of the channel;

wherein after the channel is formed, the method further comprises: forming at least one power cable in the recess;

wherein after the at least one power cable is formed in the recess, the magnetizable asphalt mixture is formed in the channel.

9. The method according to claim 8, wherein when forming the channel, a hole is formed at an edge of the channel;

wherein the at least one power cable extends into the hole where the at least one power cable is connected with the transmitter coil.

10. The method according to claim 1, wherein the holder is made of a material which when heated, realizes bonding with a surface layer covering the pre-manufactured transmitter coil assembly and with the magnetizable asphalt mixture.

11. The method according to claim 10, wherein the holder is made of laminated asphalt-saturated felt layers, and each of the laminated asphalt-saturated felt layers comprises a substrate that has been dipped in asphalt binder; or wherein the holder is made of a material or layers of a material and is bonded with an asphalt binder or a non-crystalline adhesive.

12. The method according to claim 1, wherein the method further comprises: after the pre-manufactured transmitter coil assembly is formed in the magnetizable asphalt mixture and the transmitter coil in the pre-manufactured transmitter coil assembly is bonded at a desired depth into the magnetizable asphalt mixture, removing the holder, and forming a protection mixture on top of the transmitter coil; or wherein placing the pre-manufactured transmitter coil in the magnetizable asphalt mixture comprises:

placing the pre-manufactured transmitter coil in the magnetizable asphalt mixture and forming a protection mixture on top of the pre-manufactured transmitter coil.

13. The method according to claim 1, wherein the transmitter coil assembly is designed to be located sufficiently below surface of the asphalt pavement to allow rehabilitation of the asphalt pavement by removing part of the surface and replacing the part of the surface with similar materials.

14. A wireless power transfer transmitter system, comprising:

a channel formed in a layer of a drivable civil structure;

a magnetizable asphalt mixture formed in the channel, wherein the magnetizable asphalt mixture comprises an asphalt binding substance and particles, some or all of which are magnetizable; wherein a percentage of the particles in the magnetizable asphalt mixture is one hundred percent or less, and a pre-manufactured transmitter coil or a pre-manufactured transmitter coil assembly formed in the magnetizable asphalt mixture, wherein the pre-manufactured transmitter coil assembly comprises a transmitter coil and a holder, a part of the transmitter coil is installed in the holder, and 0 to 90 percent of the transmitter coil is embedded in the magnetizable asphalt mixture.

15. The wireless power transfer transmitter system according to claim 14, further comprising at least one power cable formed in a recess at a bottom of the channel.

16. The wireless power transfer transmitter system according to claim 15, wherein a hole is formed at an edge of the channel, and the at least one power cable extends into the hole to be connected with the transmitter coil.

17. The wireless power transfer transmitter system according to claim 14, wherein the holder is made of a material which when heated, realize bonding with a surface layer covering the pre-manufactured transmitter coil assembly and with the magnetizable asphalt mixture.

18. The wireless power transfer transmitter system according to claim 14, wherein the holder is removed after installation of the transmitter coil and a protection mixture is placed on top of the transmitter coil.

19. The wireless power transfer transmitter system according to claim 14, wherein the holder extends beyond a size of the transmitter coil, a bridge of the transmitter coil where tubes or cables of the transmitter cross over each other is covered with a protection cap, and inside of the protection cap is filled with epoxy or a non-crystalline material that completely fills a void between the protection cap and the holder.

20. The wireless power transfer transmitter system according to claim 14, wherein the wireless power transfer transmitter system further comprises a cooling system that is either a passive cooling system or an active cooling system;

wherein the passive cooling system uses at least one heat pipe embedded into the magnetizable asphalt mixture and driven into surrounding ground at an angle, the angle is an angle between an extension direction of the at least one heat pipe and a plane where a bottom surface of the channel is located, and the angle varies between 0 degrees and 90 degrees; or
wherein the active cooling system uses the wireless power transfer transmitter coil which is made of hollow tubes to serve a dual purpose of generating a magnetic field to transfer power to a receiver and circulating a cooling fluid in order to reduce the temperature of the coil.

* * * * *